(12) United States Patent
Simeray et al.

(10) Patent No.: US 6,291,805 B1
(45) Date of Patent: Sep. 18, 2001

(54) DEVICE FOR INDUCTION HEATING OF A COOKING VESSEL

(76) Inventors: Janick Simeray, 9, rue Paul Bert, F-92700 Colombes; Yves May, 13, rue du General Parshing, F-78000 Versailles, both of (FR)

( * ) Notice: Subject to any disclaimer, the term of this patent is extended or adjusted under 35 U.S.C. 154(b) by 0 days.

(21) Appl. No.: 09/308,817
(22) PCT Filed: Nov. 25, 1997
(86) PCT No.: PCT/FR97/02125
§ 371 Date: Aug. 30, 1999
§ 102(e) Date: Aug. 30, 1999
(87) PCT Pub. No.: WO98/24270
PCT Pub. Date: Jun. 4, 1998

(30) Foreign Application Priority Data

Nov. 26, 1996 (FR) .................................................. 96 14475

(51) Int. Cl.[7] ..................................................... H05B 6/12
(52) U.S. Cl. ......................... 219/621; 219/622; 219/624; 219/627; 219/670; 99/DIG. 14
(58) Field of Search ..................... 219/622, 623, 219/624, 625, 626, 627, 621, 647, 672, 670; 99/DIG. 14, 451

(56) References Cited

U.S. PATENT DOCUMENTS

| 3,843,857 | 10/1974 | Cunningham | 219/624 |
|---|---|---|---|
| 3,979,572 | * 9/1976 | Ito et al. | 219/624 |
| 4,110,587 | * 8/1978 | Souder, Jr. et al. | 219/624 |
| 4,129,767 | * 12/1978 | Amagami et al. | 219/626 |
| 4,456,807 | * 6/1984 | Ogino et al. | 219/626 |
| 4,910,372 | 3/1990 | Vukich | 219/622 |
| 4,980,539 | * 12/1990 | Walton | 219/689 |
| 4,996,405 | * 2/1991 | Poumay et al. | 219/624 |
| 5,155,319 | * 10/1992 | Chiu | 219/622 |

FOREIGN PATENT DOCUMENTS

| 2505341 | 8/1976 | (DE) . | |
| 2505395 | 8/1976 | (DE) . | |
| 25 35 223 | * 2/1977 | (DE) | 219/624 |
| 52-70444 | * 6/1977 | (JP) | 219/624 |

* cited by examiner

*Primary Examiner*—Philip H. Leung
(74) *Attorney, Agent, or Firm*—Millen, White, Zelano & Branigan, P.C.

(57) ABSTRACT

A device for heating a cooling vessel for keeping warm the food contained in the vessel. A mobile support is provided for the vessel in which are arranged a supply module comprising a source of live electric energy including a high frequency voltage selector supplied by the source and at least a flat inductor of fine thickness supplied by the voltage selector. The source of electric energy generating an electromagnetic field perpendicular to the support plane and a flat armature of fine thickness made up of completely closed spires and placed under the vessel parallel to the supporting table.

29 Claims, 3 Drawing Sheets

FIG 4
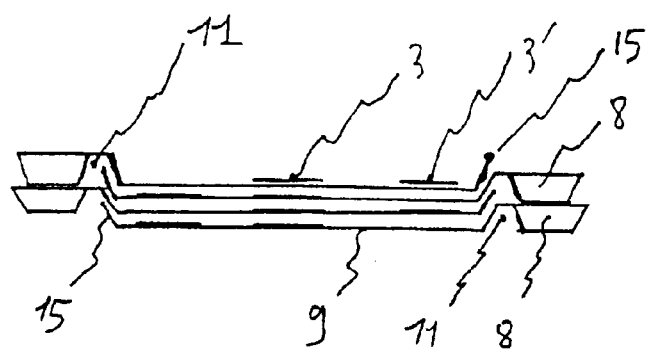
FIG 5
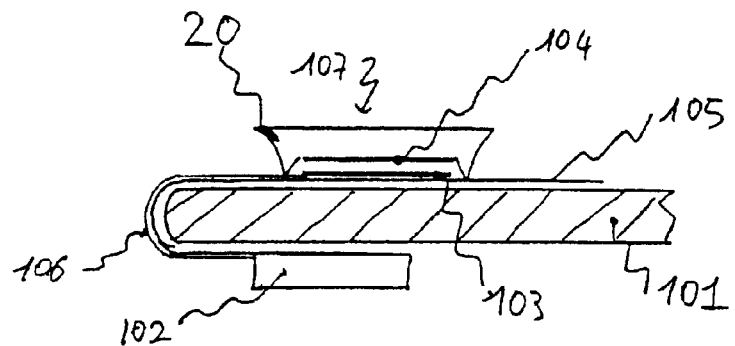
FIG 6      FIG 7
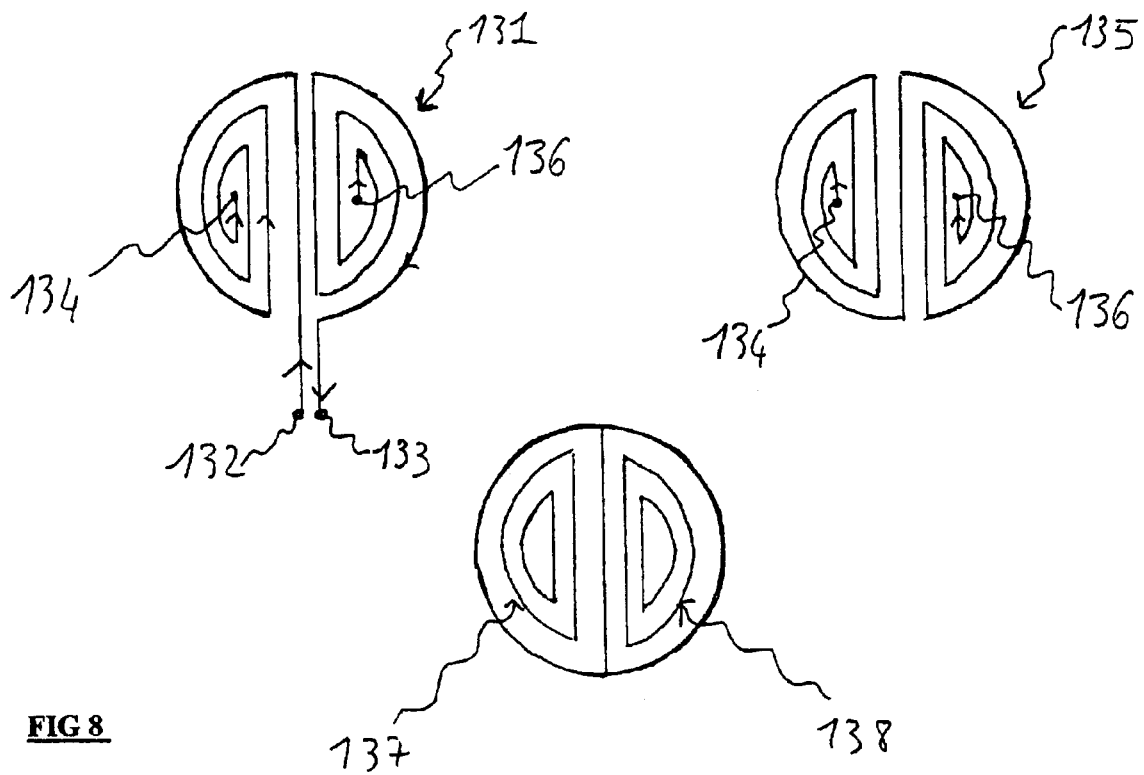
FIG 8

DEVICE FOR INDUCTION HEATING OF A COOKING VESSEL

FIELD OF THE INVENTION

The present invention concerns the heating of food vessels for keeping the contained food at the good temperature.

BACKGROUND OF THE INVENTION

When one eats hot dishes, they cool rapidly and it is desirable to heat them for keeping them at the good temperature. For this purpose, one has conceived chafing dishes which are heated electrically by Joule effect or by a gas capsule or candles. This system is relatively dangerous since the network voltage or a flame is brought on the table. Furthermore, that does not solve the problem of the cooling in the plates.

For the latter, a first solution, used mainly in restaurants, consists in serving in plates which have been beforehand heated. This necessitates an important organization and manipulations with risk of burns; anyhow, since the thermal capacity is low, the dishes cool rapidly before one has finished to eat them.

Another solution consists in electrically heating the plates when eating either by heating cushions which are placed under the plates or by heating resistors which are integrated in the plates. In the first case, there exists the risk of burns by the heating cushion when the plate is not in place and in the second case, the plate is heavy and connected to an electrical cable, what is not practical and can be harmful.

In the case of cafeterias, especially in works canteens, one is lead to eat the hot dish at first before it cools. Therefore, there are generally provided furniture's where the plate can be kept hot when eating the hors-d'oeuvres.

The patent DE 25 05 341 which describes in detail two realizations of vessels heated by induction, which are intended to be placed opposite to an inductor, is well known. The invention does not concern on the induction device.

The novelty consists in the realization of a conductive spiral on the bottom of the vessel for leading the induced currents and, especially, in the realization of a strap for closing the spiral.

Two methods of realization of this strap are detailed, one by insertion of a conducting wire in the material of the plate, the other by metallic deposit on the plate.

In this German patent, the inventor took pains to resolve a problem which does not exist. As a matter of fact, by heating a vessel through induction, in this vessel are involved currents which are the inverse image of the currents of the inductor. By replacing the spiral by four dosed concentric circles, the current in each circle is exactly the same as in the spiral, and also as in the inductive heating. It is not necessary to conceive a strap whatever the realized trick may be.

This document does not disclose a support (tray, set of table mats, et cetera) which is supplied with a complete feeding device comprising a voltage source and a chopper.

We know also two German utility models which are dealing with a subject which is close to our application.

These are the applications DE 296 12 514 of 9 7 96 and DE 296 21 541 of Dec. 12 1996.

The first model shows a tray comprising inductive elements, it is anterior to our application.

This tray with its inductor has to be connected to an adapted external element which generates harmonic current and is itself connected to a voltage source.

Here again, there is no support comprising an inductor, its feeding and its integrated voltage source.

The second model is posterior to our application.

The first model has been filed on July 9, 1996 but has been published only on December 12, 1996. It can not constitute an prior document that could be cited against our application. It is a prior right in Germany.

The basic problem of the invention is to provide a mobile heating device which allows, with simple means, to heat or to maintain at temperature a plate or a dish without risk of burns, without complicated manipulation, especially without having to undertake a connection, and without flame or electrical voltage which could be harmful.

Furthermore, the invention allows to adjust the temperature of the plate or the dish always without complicated manipulation.

For this purpose, the object of the invention is a mobile heating device of a cooking vessel, such as a plate or a dish, which is placed on a table, for keeping hot the hot foods contained in the said vessel, characterized in that it comprises:

a support of the vessel, such as a tray or a set of table mats, in which are arranged a supply module comprising a source of electric energy live with a safe direct voltage, a high frequency chopper which is fed by said source and at least a flat inductor of fine thickness supplied by the chopper and generating an electromagnetic field which is perpendicular to the plane of the table, and a flat armature of fine thickness made up of completely closed turns and placed under the vessel parallel to the plan of the table, the vessel being placed on the support and the armature being magnetically coupled with the inductor so that eddy currents flow in the armature.

The heating occurs only when the vessel is placed on the support and there is no heating, and therefore no risk of burn, when one puts hands on the set of table mats; in the same way, if one puts a metallic object, such as a fork or a spoon or a watch, on the support, there is practically no heating too.

In the case of cafeterias, it is no longer necessary to plate heating furniture's and it is possible to eat the meal in the normal order while having a hot dish at the good temperature.

There no particular manipulation since it is enough to put the plate on the support; especially, it is not necessary to realize an electric connection, the support remaining permanently connected.

Furthermore, the voltage of the support is a safe voltage, for example 12V.

The use of a high frequency allows to increase the efficiency of the coupling, therefore of the heating.

Advantageously, the inductor(s) have a high inductance at the frequency of the voltage generator and a low resistance and the armature has, seen from the primary a low inductance and a resistance which is substantially equal to the ratio of the square of the voltage of the source to the necessary power for the heating.

This disposition allows to obtain a maximum output for the heating.

According to another characteristic of the invention, the electromagnetic fields generated by the inductor and the turns of the armature are not rotational symmetrical so that the magnetic coupling of the armature with the inductor varies according to the relative angular position of the inductor and the armature.

Thanks to this variation of the coupling, one can adjust the temperature of the vessel.

According to an embodiment of the invention, the inductor and the armature are oval shaped.

According to another embodiment of the invention, the inductor comprises two substantially circular adjacent coils connected in series and generating electromagnetic fields of opposite directions and the armature comprises two adjacent sets of substantially circular turns.

This disposition allows also to obtain a variable coupling, but also to highly reduce the electromagnetic radiation of the inductor and, as a result, perturbations on the environment.

According to a first embodiment of the invention, the support of vessel is a tray and the source of electrical power is an electrochemical generator.

Advantageously, the electrochemical generator is a rechargeable element and the supply module comprises means for comparing the voltage on the inductor(s) and the voltage of the source and a negative feedback circuit which controls the pulsed voltage generator so that its duty factor vanes inversely to the voltage on the inductor(s).

This disposition allows to recharge the rechargeable element by induction between the supports.

According to another characteristic of the invention, the supply module is placed in an receptacle arranged along one edge of the tray and separated from the rest of the tray by a longitudinal recess.

It is therefore possible to superimpose trays by placing them head to foot for recharging the rechargeable elements.

Advantageously, the support of vessel comprises two inductors, a substantially centric one and one disposed in a corner.

This allows to keep the vessel hot by posing it in the corner when eating another dish, for example the hors-d'oeuvre.

According to a second embodiment of the invention, the support of vessel is a set of table mats, the source of electrical power is a rectifier circuit connected to a transformer fixed under the table and the supply module is placed in a part of the set of table which is folded under the table.

Advantageously, the transformer of the supply module is fixed under the table and the rest of the supply module is placed in a part of the set of table which is folded under the table.

This allows to simplify the manufacture, the totality of components, except the transformer, especially the chopper of current, being realized in the support.

Advantageously, the table comprises a common transformer feeding the totality of the sets of table placed on the table and the sets of table are fed by a cable lying under the table at its periphery.

This disposition allows to simplify the structure and to reduce the cost price. Moreover it allows to have a table with an arbitrary arrangement of the guests.

According to another embodiment of the invention, the inductor is integrated in the upper face of the table.

This disposition is particularly advantageous for restaurants, especially for the cafeterias.

Advantageously, the support of vessel comprises at least a projecting part which corresponds with an inductor and is used for the positioning of the vessel.

This allows to obtain automatically an optimal heating, because the centering of the plate is automatically realized, what insures an optimal coupling.

According to again another characteristic of the invention, the vessel comprises a thermometer, such as a LCD thermometer, on its upper face.

In this manner, one can adjust and check more precisely the temperature of the plate.

BRIEF DESCRIPTION OF THE DRAWINGS

Others characteristics and advantages of the invention will emerge from the following specification, which is illustrative and not at all restrictive, by referring to the drawings on which:

the FIG. 1 is a side view of a first embodiment of the invention in which the support of vessel is a tray, the FIG. 2 is a topview of the tray of the FIG. 1, the FIG. 3 is a block diagram of the supply module, the FIG. 4 represents several head to foot superimposed trays for recharging their rechargeable elements, the FIG. 5 represents a second embodiment of the invention in which the support of vessel is a set of table, FIGS. 6 and 7 illustrate an embodiment of the inductor, the FIG. 8 illustrates an embodiment of the armature corresponding to the inductor of FIGS. 6 and 7, the FIG. 9 represents an embodiment of the set of table, the FIG. 10 represents the set of table mats of the FIG. 9 in place on the table, the FIG. 11 is a cross section of the set of table of the FIG. 9, and the FIG. 12 is the block diagram of the supply module of a fixed device such as a chafing dish placed at the center of a table.

DETAILED DESCRIPTION

Figure 1:
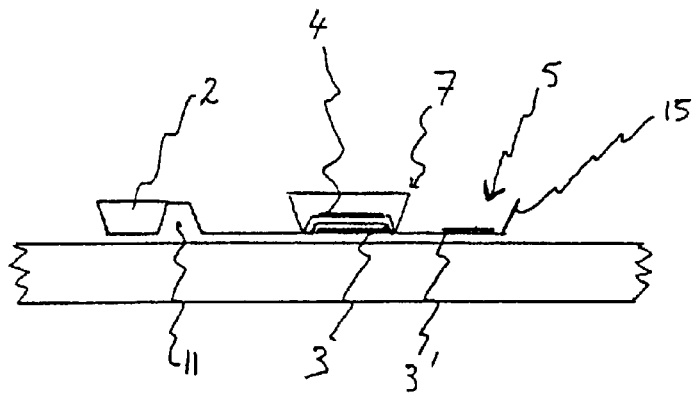

The FIG. 1 schematically represents a heating device according to the invention; it is constituted by a tray 5 installed on a table 1 which is partly shown and it comprises three elements, namely a supply module 2, two inductors 3 and 3' and an armature 4. The inductors 3 and 3' are flat inductors which are integrated in the bottom of the tray 5 and connected to the supply module 2.

The armature 4 is flat and disposed in the bottom of a plate 7 which is placed on the tray 5 over the inductor 3 so that it lies in the electromagnetic field, perpendicular to the plan of the table, generated by the inductor 3.

Figure 2:
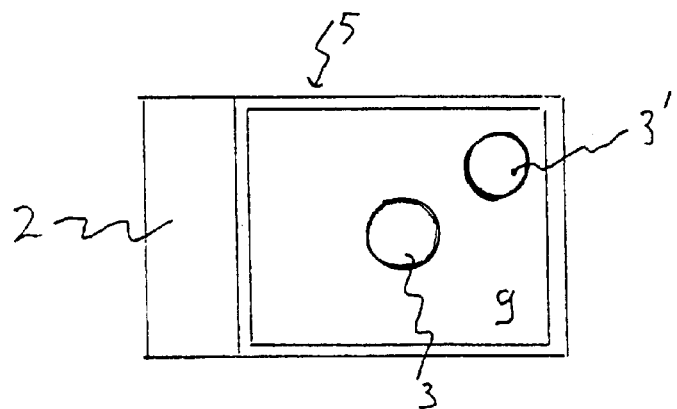

As can be seen on the FIG. 2, the inductor 3 lies substantially at the center of the tray 5 and the second inductor 3' is arranged in the right front corner; it is used for keeping hot the main dish when eating the entree.

The supply module is placed in an receptacle 8 arranged along one side of the tray and separated from the part 9 of the tray receiving the dishes by a longitudinal recess 11.

Figure 3:
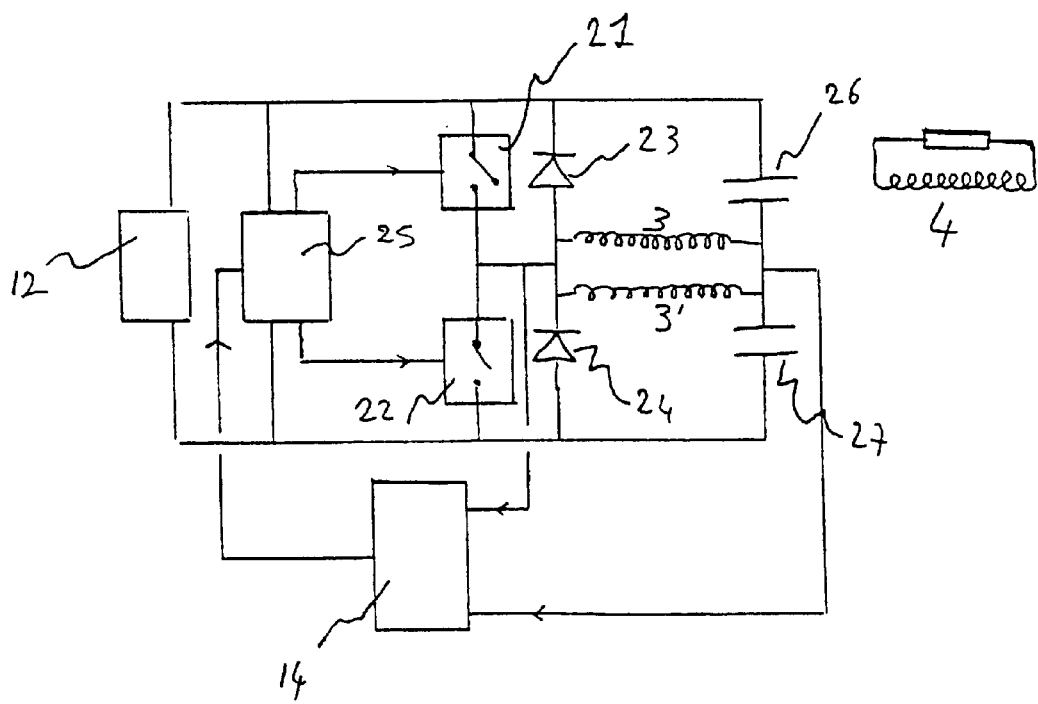

The FIG. 3 is the block diagram of the supply module. It comprises a source of electrical power 12 with safe direct voltage, for example 12 V, which is connected on a reversible current chopper comprising essentially two transistors 21 and 22, two freewheeling diodes 23 and 24 and a control unit 25. Both inductors 3 and 3', which are connected in parallel, are connected in series with a condenser 26, respectively 27, between the mid point of the chopper and each of the output terminals of the latter.

The frequency of the voltage provided by the chopper of current is high, for example approximately 300 kHz, and the inductors 3 and 3' have, for this frequency, a inductance which is low and a low resistance. On the other hand, the inductance of the armature 4, seen from the primary, that is to say at the inductor, is low and its resistance is high, it is advantageously optimized for the maximal heating power, P, for example 15 to 20 W, and equal to $V^2/P$, V being the voltage of the source.

The supply module comprises a comparator 14 which compares the voltage of the source 12 and the voltage on the inductors. It comprises a negative feedback circuit which controls the current chopper in such manner that its duty factor and, as a result, its output voltage vary inversely in comparison with the voltage of the source 12.

In this embodiment, the source 12 is constituted by a rechargeable element, such as an accumulator, which can be recharged by an external loading circuit connected on its terminals.

When no armature is coupled with the inductors 3 and 3', the voltage on their terminals is high and the chopper is controlled so as to provide a low voltage (low duty factor) and the supply module is in the stand-by condition, its consumption being very low.

When an armature 4 is placed over an inductor 3 or 3', there is a coupling between them, which induces a drop of the voltage of the inductors due to the low resistance induced by the inductor. The comparator acts then for increasing the duty factor of the chopper and the source 12 supply the inductor which generates eddy currents in the armature and heats the plate 7.

For recharging the rechargeable elements, the trays are put one over the other head to foot with a shift as shown on FIG. 4; the edges 15 opposite to the receptacles 8 penetrate then in the recesses 11 of such manner that the bottoms of the parts 9 of the trays are in contact.

The inductors 3 which are disposed at the center of the part 9 of the tray are then placed one the over the other and therefore magnetically coupled. If the lower tray of the stack of trays is connected to an external source of recharge of its accumulator, since the current chopper is reversible, the regulation circuit will control the chopper of the lowest tray for providing a high voltage to the inductor 3 which will induce a high voltage in the inductor 3 of the overlaying tray whose chopper will recharge the accumulator.

When the accumulator of a tray will be recharged, this tray will recharge the next tray and the totality of the trays will be then recharged successively from the lowest tray.

The FIG. 5 represents, schematically, a second embodiment of the invention; it is constituted by a set of table mats 105 installed on a table 101 which can be seen only partly and it comprises three elements, namely the supply module 102, an inductor 103 and an armature 104. The inductor 103 is a flat inductor integrated in the set of table 105 and connected to the supply module 102.

The armature 104 is flat and disposed on the bottom of a plate 107 which is placed on the set of table mats 105 over the inductor 103 so that it lies in the electromagnetic field, perpendicular to the plane of the table, which is generated by the inductor.

Advantageously, the field generated by the inductor 103 has no rotational symmetry and the shape of the turns of the armature 104 is adapted to the profile of the field of the inductor. For example, the coil of the inductor is oval shaped and the turns of the armature have a corresponding form. In this manner if the great axes of the inductor and the armature are not in the same plane, the magnetic coupling is lower and the intensity of the eddy currents in the armature is lower. The heating is then less strong. In this manner, it is possible to adjust and check the temperature of the plate.

To facilitate this adjustment the plate can be supplied with a thermometer, such as a LCD thermometer, on its upper face.

FIGS. 6 to 8 represent another embodiment of an asymmetrical field. In this case, the inductor comprises two substantially adjacent circular coils whose directions of the current are opposite for generating two adjacent fields of opposite directions.

The coil has a double layer and is constituted of two flat windings which are arranged on both sides of a substrate. FIGS. 6 and 7 represent both these windings which are disposed one over the other. The upper winding 131 of FIG. 6 comprises two terminals 132 and 133 connecting to the supply module; it includes a first spiral connected between the terminal 132 and a first connection 134 to the lower winding 135 of the FIG. 7 and a second spiral winded in the opposite direction and disposed between a second connection 136 to the lower winding 135 and the terminal 133. The connections between the two windings are advantageously realized by means of a clip.

The lower winding 135 includes two spirals which are connected in series between the connections 134 and 136 and have opposite directions. The circulation of the current is indicated by arrows and it can be seen that two adjacent fields of opposite directions are generated.

The FIG. 8 represents the turns of the armature in this embodiment; it comprises two groups 137 and 138 of closed turns which are substantially circular, coaxial and located opposite to both coils of the inductor.

Figure 9:
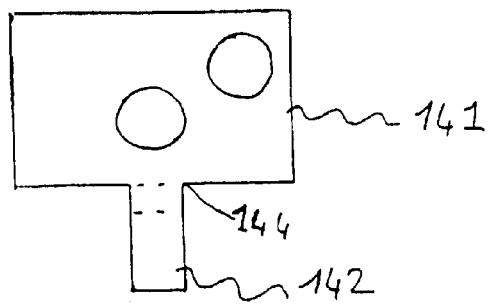
Figure 10:
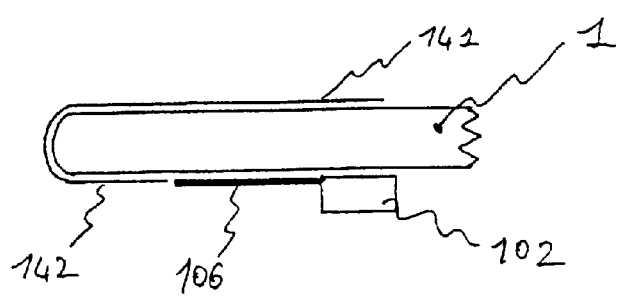

The FIG. 9 represents an embodiment of the set of tables; it includes an upper part 141 which is put on the tables and a lower part 142 which is placed under the tables, as represented on the FIG. 10, and comprises for that purpose folding lines 144.

The upper part 141 comprises the inductor and the lower part 142 comprises the circuits of the supply module 106, except for the transformer 102.

Figure 11:
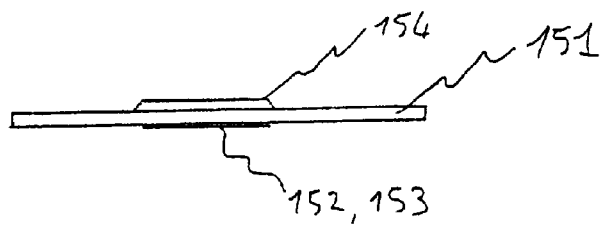

The FIG. 11 represents in cross section the upper part of the set of tables 141 of FIGS. 9 and 10 it is constituted of a substrate or support 151 on which are fixed the two layers 152 and 153 of the coil of the inductor, these layers are for example in resin, such as the epoxy resin, in which the windings, for example in copper, are embedded. The support can be realized in a flexible and adhesive material, such as rubber. Wood or cork can also be used because this support does not heat and does not risk to burn or alter to the heat.

Advantageously, the upper face of the set of tables comprises a protruding part 154 which allows to position the armature of the plate over the inductor 152 and 153.

Figure 12:
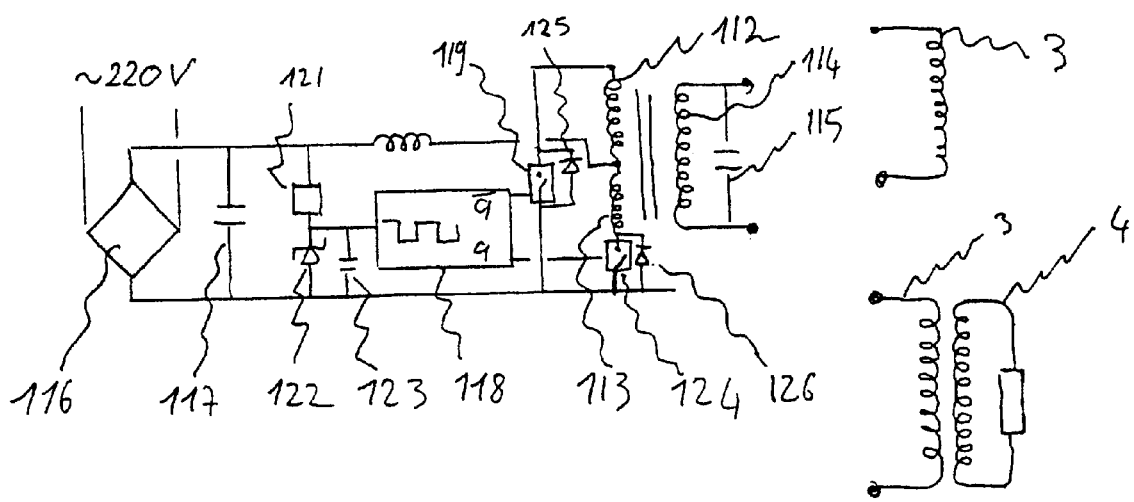

The FIG. 12 is the diagram of the supply module 2 intended for a fixed chafing dish disposed at the center of a table. It comprises a step-down transformer 111 including a primary 112 with mid point 113 and a secondary 114 which comprises a parallel condenser 115 and whose terminals are connected to the inductor 103. This transformer 111 provides a safe voltage of 12 V from the voltage of the network. This voltage is sent on one of the windings of the primary 112 by the intermediary of a current chopper which includes a rectifier bridge 116 which comprises a parallel condenser 117 at its output. The positive terminal of the output direct voltage of the rectifier bridge 116 is sent, by the intermediary of a resistance 121, a Zener diode 122 and a condenser 123 to the input of a flip-flop 118 whose frequency is 300 kHz and whose output Q is sent to the basis of a FET transistor 119 connected in parallel on the primary 112 of the transformer 111.

The output Q of the flip-flop 118 is sent to the basis of a second FET transistor 124 which is connected in series between the primary 112 of the transformer 111 and the negative terminal of the output of the rectifier bridge 116. The two transistors 119 and 121 are protected by a diode 125, respectively 126.

The set of table can be fixedly positioned under the tablecloth, especially in the case of restaurants; it can also be integrated in the table. For a domestic use, it is possible to provide removable sets of table which can be arbitrary placed in function of the number of guests.

Advantageously, it is provided a single common transformer for a table; it is disposed at the center and can be connected to each set of table by a cable disposed under the table at its periphery. It is also possible to provide a central set of table used as a chafing dish.

On the plates, the armature can be fixed under the bottom during the manufacture of the plate. It can also be fixed by gluing or in a similar way by the user. Thus, it is possible to sell to the users a transformer, sets of table and armature sheets which are glued on the bottom of plates that are already available in the house or in the restaurant.

But the armature can also be realized in the form of a conductive deposit on or under the bottom of the plate.

Thus, it is possible to sell to the users a transformer, sets of table and armature sheets which are glued on the bottom of plates that are already available in the house or in the restaurant.

The invention is not limited to the represented embodiments; especially, the inductors of FIGS. 6 and 7 can be realized in a tray. Furthermore, the set of table can also comprise a source constituted by an accumulator.

In addition, as represented on the FIG. 5, it can be provided a detector of temperature 20, such as a LCD thermometer, on the plate so as to better check and adjust the temperature of the foods.

An alternative of realization of the invention by combination of the above represented components joins in a support, a tray or a set of table or any other support or food vessel clothing, an inductor, as 3 in FIG. 2, connected to an electronic chopper under safe voltage as described in FIG. 3, a source of voltage 12, FIG. 3, constituted by a rechargeable element such as an accumulator which can be recharged, and a recharging circuit connected to the network during the charge.

According to an example of realization of this alternative, the recharging circuit is a circuit of the type described in FIG. 12, comprising a rectifier 116, a smoothing condenser 117, switching elements 122, 123 and 118 and a transistor 119. The inductor 113 is the inductor 3 or 3' the FIG. 3. A condenser (not shown on the diagram) is placed in series between the inductor 3 and 3' and the transistor 119.

In this embodiment, and without the armature 4, the electronic circuit of the FIG. 12 acts as a current loader for the battery 12 (FIG. 3) in association with the components 32, 24, 3, 3', 26 and 27.

The quench frequency of the element 118 is adjusted in order that the circuit 3, 3', 26, 27 acts as a resonant trap oscillator. The voltage sent to the terminals of 12 is then a fraction of the voltage sent to the terminals of 116.

A second alternative of realization comprises a support of vessel with the function of a clothing and a food vessel with the function of a box or a bottle.

For example, the support can be a Thermos flask or a feeding-bottle heater, and the food vessel a feeding-bottle or a bottle.

For example, the support can be a thermally insulating mess bowl and the food vessel a can or a deep-frozen trough.

For example, the support can be a glass mat or saucer and the vessel a glass or a cup.

In all cases the support comprises a source of electric energy at a safe voltage, a current chopper working at a high frequency and fed by said source and at least a flat inductor generating a vertical magnetic field. According to a preferred realization, the source is a rechargeable battery, and the support comprises also an electronic circuit for the recharge of the battery. This electronic circuit for the recharge of the battery is connected to the network.

In all cases, the food vessel comprises an armature laying opposite to the inductor of the support. The induced currents flow through this armature and insures the keeping hot or the heating of foodstuffs.

This association of an armature, a switching electronic circuit, a rechargeable battery and an electronic circuit for recharging the battery from the network voltage, which are integrated in a support, and of a food vessel supplied with an armature provides a complete and original service.

It insures the keeping hot of foods, a portable and autonomous heating means without constraint or combustion of gas or other. The recharge makes it possible to use the device an indefinite number of times.

Food vessels are supplied with armatures or metallic by their construction.

The battery provides the necessary instantaneous energy, it contributes to regulate the average power drawn from the network. Thus it contributes to the security of use, because, at a low power, the recharge from the network voltage sector is robust, durable, compact and cheap. At a low voltage, the chopper at a safe voltage is both powerful and secure.

Thus, for a Thermos flask used for heating a feeding-bottle, the domestic use is made by leaving the device in a steady recharge, the battery taking the place when the feeding-bottle heats. Supplied with a cork, it becomes a Thermos flask, autonomous and transportable. It allows to transport the cold milk, and the releasing of the induction fed by the battery allows to rapidly heat the milk at the right moment.

What is claimed is:

1. An arrangement for a heating device adapted to be placed on a table for heating a cooking vessel, for keeping hot the hot foods contained in said vessel, the arrangement comprising:

a mobile vessel support having laterally separated first and second portions, the mobile vessel support adapted to rest on a table;

a power supply module in the first portion of the mobile vessel support, the power supply module comprising a rechargeable source of electric energy live with a safe direct current;

at least one flat inductor in the second portion of the mobile vessel support the flat inductor being supplied with electric current by a high frequency current chopper connected to the source of electric energy in the power supply module, the flat inductor generating an electromagnetic field which is perpendicular to a horizontal plane of the table upon which the heating device is adapted to rest; and a field armature of minimal thickness comprised of completely closed turns, the field armature being integral with the vessel to provide a mobile assembly therewith separate from the flat inductor and the armature cooperating with the vessel and flat inductor to heat food within the vessel by heat generated in the armature due to eddy currents flowing therein induced by magnetic coupling with the flat inductor; and the mobile vessel support being configured to cooperate with similar mobile vessel supports when stacked in an alternating array therewith in which first portions of every other vessel support are aligned in the stack so that the power supply modules of every other mobile vessel support are aligned.

2. Heating device according to claim 1 characterized in that the mobile vessel support is a tray and the vessel is a dish or a plate, intended to be placed on said tray.

3. Heating device according to claim 1 characterized in that the electromagnetic field generated by the inductor (3; 103) and the turns of the armature (4; 104) rotationally asymmetric so that the magnetic coupling of the armature with the inductor varies according to the relative angular position of the inductor and the armature.

4. Heating device according to claim 3 characterized in that the electromagnetic field generated by the inductor and armature are oval shaped.

5. Heating device according to claim 3, characterized in that the inductor (3; 103) comprises two substantially circular adjacent coils (131, 135) connected in series and generating electromagnetic fields of opposite direction and in that the armature (4, 104) comprises two adjacent sets of substantially circular turns.

6. Heating device according to claim 1, characterized in that the frequency of the generator of pulsed voltage is in the order 300 kHz.

7. Heating device according to claim 1 characterized in that the inductor(s) (3) or (103) include a primary coil and have a high inductance at the frequency of the generator of voltage and low resistance and in that the armature (4) or (104) has, seen from the primary coil, a low inductance a low inductance and a resistance which is substantially equal to the ratio of the square of the voltage of the source to the necessary power for the heating.

8. Heating device according to claim 1, characterized in that the support of the vessel is a tray (15) and in that the source of electric power is an electrochemical generator.

9. Heating device according to claim 8 characterized in that the electrochemical generator is a rechargeable element (12) and in that the supply module comprises means for comparing (14) the voltage on the inductor(s) and the voltage of the source and a negative feedback circuit 925) which controls the pulses voltage generator so that its duty factor varies inversely to the voltage on the inductor(s).

10. Heating device according to claim 8, characterized in that the supply module is placed in a receptacle (2) disposed along an edge of the tray (15) and separated from the rest of the tray by a longitudinal recess (11).

11. Heating device according to claim 1 characterized in that the support of vessel comprises two inductors, a substantially centric one (3; 103) and one (3') disposed in a corner.

12. Heating device according to claim 1 characterized in that the support of vessel is a set of tables (105) and in that the source of energy is an electrochemical generator.

13. Heating device according to claim 12 characterized in that the substrate is made of thermally insulating material.

14. Heating device according to claim 12 characterized in what the substrate is made of nonskid material.

15. Heating device according to claim 12 characterized in that the element the circuit printed is on has two faces with the windings thereon and in that the windings of the two faces are connected.

16. Heating device according to claim 1, characterized in that the support is a flexible set of tables and in that source of electric power is a rectifier circuit connected on a transformer fixed under the support table and in that the supply module is disposed in a part of the set of tables (102) which is folded under the support table.

17. Heating device according to claim 16, characterized in that each table comprises a common transformer feeding the totality of the sets of tables disposed on the support table.

18. Heating device according to claim 1, characterized in that the or the inductors (3, 3, 103) are realized in the form of a flexible printed circuit fixed on a substrate.

19. Heating device according to claim 1, characterized in that the inductor(s) are integrated in the upper face of the table.

20. Heating device according to claim 1, characterized in that the armature (4; 104) is glued under the vessel (7).

21. Heating device according to claim 1, characterized in that the armature is realized in the bottom of the vessel during the manufacture of the latter.

22. Heating device according to claim 1, characterized in that the armature is realized by deposit on the bottom of the vessel.

23. Heating device according to claim 1, characterized in that the support of vessel comprises at least a protruding part (154) which corresponds with an inductor (152; 153) and is used for the positioning of the vessel (7).

24. Heating device according to claim 1, characterized in that the vessel comprises a thermometer 20, such as a LCD thermometer, on its upper face.

25. Heating device according to claim 1, characterized in that the source of energy of the mobile support is a rechargeable battery, and in that said support comprises also a step-down transformer for recharging the battery from a network.

26. Heating device according to claim 1, characterized in that the vessel is a bottle or a feeding-bottle and the support is a portable and autonomous Thermos flask which heats the feeding-bottle.

27. Device according to claim 1, characterized in that the support is a glass mat or a saucer and the vessel is a glass or a cup.

28. Device according to claim 1, characterized in that the vessel is a can or a deep-frozen trough and the support is a transportable isothermal casing intended for reheating it and keeping it hot.

29. Heating device according to claim 1 characterized in that the mobile vessel support comprises a set of table mats and the vessel is a dish or a plate intended to be placed on said set of table mats.

* * * * *